(12) United States Patent
Kimbell et al.

(10) Patent No.: US 11,920,987 B2
(45) Date of Patent: Mar. 5, 2024

(54) FAST RESPONSE TEMPERATURE SENSORS

(71) Applicant: In-Situ, Inc., Fort Collins, CO (US)

(72) Inventors: Benjamin Kimbell, Fort Collins, CO (US); Elijah Lyle Scott, Fort Collins, CO (US); Nathan T. Baltz, Fort Collins, CO (US)

(73) Assignee: In-Situ, Inc., Ft. Collins, CO (US)

( * ) Notice: Subject to any disclaimer, the term of this patent is extended or adjusted under 35 U.S.C. 154(b) by 0 days.

(21) Appl. No.: 17/517,532

(22) Filed: Nov. 2, 2021

(65) Prior Publication Data

US 2022/0163406 A1 May 26, 2022

Related U.S. Application Data (63) Continuation of application No. 16/251,651, filed on Jan. 18, 2019, now Pat. No. 11,181,427.

(60) Provisional application No. 62/619,009, filed on Jan. 18, 2018.

(51) Int. Cl.
*G01K 13/02* (2021.01)
*F01D 17/08* (2006.01)
*G01K 7/42* (2006.01)

(52) U.S. Cl.
CPC ............ *G01K 13/02* (2013.01); *F01D 17/085* (2013.01); *G01K 7/42* (2013.01); *G01K 13/026* (2021.01)

(58) Field of Classification Search
CPC ........ G01K 13/02; G01K 7/42; G01K 13/026; F01D 17/085
See application file for complete search history.

(56) References Cited

U.S. PATENT DOCUMENTS

| 4,091,265 | A | * | 5/1978 | Richards | F02M 31/125 |
| | | | | | 219/205 |
| 4,220,039 | A | * | 9/1980 | Taylor | G01F 1/68 |
| | | | | | 73/204.19 |
| 4,480,467 | A | | 11/1984 | Harter et al. | |
| 4,901,061 | A | | 2/1990 | Twerdochlib | |
| 5,450,066 | A | | 9/1995 | Brighenti et al. | |
| 5,454,641 | A | * | 10/1995 | Parker | G01K 1/20 |
| | | | | | 374/E1.019 |

(Continued)

FOREIGN PATENT DOCUMENTS

| CN | 103930752 A | 7/2014 |
| CN | 204043802 A | 12/2014 |

(Continued)

OTHER PUBLICATIONS

U.S. Appl. No. 16/251,651, filed Jan. 18, 2019.

(Continued)

*Primary Examiner* — Gail Kaplan Verbitsky
(74) *Attorney, Agent, or Firm* — Leydig Voit & Mayer, Ltd.

(57) ABSTRACT

Provided herein is a differential temperature sensor which utilizes multiple temperature sensors to quickly and accurately calculate ambient fluid temperature with a reduced response time. The provided systems and methods utilize a first fluid temperature sensor and a second probe temperature sensor to account for the thermal impact of the device on the ambient fluid temperature and the effect of heat within the device, or temperature difference between the probe and fluid temperature, on the first fluid temperature sensor measurement.

17 Claims, 6 Drawing Sheets

(56) References Cited

U.S. PATENT DOCUMENTS

| | | | |
|---|---|---|---|
| 5,601,363 A * | 2/1997 | Keil | G01N 27/18 |
| | | | 374/114 |
| 5,660,473 A * | 8/1997 | Noma | G01K 1/16 |
| | | | 374/208 |
| 5,877,476 A | 3/1999 | Yabuki et al. | |
| 6,354,734 B1 | 3/2002 | Curran et al. | |
| 7,458,718 B2 | 12/2008 | Krishnamurthy et al. | |
| 7,740,401 B2 | 6/2010 | Kozlowski et al. | |
| 8,118,481 B2 * | 2/2012 | Camp | G01F 1/696 |
| | | | 374/45 |
| 8,147,130 B2 * | 4/2012 | Sakami | G01B 21/085 |
| | | | 374/134 |
| 8,413,615 B2 | 4/2013 | Tsuge | |
| 8,851,744 B1 | 10/2014 | Feller | |
| D755,655 S | 5/2016 | Scott et al. | |
| D787,962 S | 5/2017 | Scott et al. | |
| D787,963 S | 5/2017 | Scott et al. | |
| D787,964 S | 5/2017 | Scott et al. | |
| 9,689,855 B2 | 6/2017 | Scott et al. | |
| 9,778,180 B2 | 10/2017 | Baltz et al. | |
| D803,081 S | 11/2017 | Scott et al. | |
| 9,835,554 B2 | 12/2017 | Scott et al. | |
| 10,302,616 B2 | 5/2019 | Scott et al. | |
| 10,309,837 B2 | 6/2019 | Liehr et al. | |
| 10,317,295 B2 * | 6/2019 | Rud | G01K 7/16 |
| 10,365,097 B2 | 7/2019 | Steinbach et al. | |
| 10,393,654 B2 | 8/2019 | Baltz et al. | |
| 10,401,230 B2 | 9/2019 | Fujisawa et al. | |
| 10,429,369 B2 | 10/2019 | McKee et al. | |
| 10,591,389 B2 | 3/2020 | Trumbo | |
| 10,670,546 B2 | 6/2020 | Rud et al. | |
| 10,704,979 B2 | 7/2020 | Bailey | |
| 10,809,213 B2 | 10/2020 | Daw et al. | |
| 10,890,526 B2 | 1/2021 | Scott et al. | |
| 10,908,140 B2 | 2/2021 | McKee et al. | |
| 10,914,718 B2 | 2/2021 | Scott et al. | |
| 10,989,657 B2 | 4/2021 | Baltz et al. | |
| 11,060,956 B2 | 7/2021 | Trumbo | |
| 11,181,427 B2 | 11/2021 | Kimbell et al. | |
| 2002/0144994 A1 | 10/2002 | Golan et al. | |
| 2002/0163955 A1 * | 11/2002 | Yu | A61D 13/00 |
| | | | 374/E13.002 |
| 2007/0189358 A1 * | 8/2007 | Lane | G01J 5/0025 |
| | | | 374/E13.002 |
| 2009/0288481 A1 | 11/2009 | Urssens et al. | |
| 2012/0039362 A1 | 2/2012 | Pedersen et al. | |
| 2012/0232809 A1 * | 9/2012 | Steckling | G01F 1/696 |
| | | | 73/204.25 |
| 2013/0039383 A1 | 2/2013 | Jetter et al. | |
| 2013/0128925 A1 | 5/2013 | Hoenicka et al. | |
| 2014/0155710 A1 | 6/2014 | Rowland et al. | |
| 2014/0287641 A1 | 9/2014 | Steiner | |
| 2014/0348205 A1 * | 11/2014 | Shaw | E03B 7/09 |
| | | | 374/142 |
| 2015/0204733 A1 * | 7/2015 | Newell | G01K 7/16 |
| | | | 374/141 |
| 2017/0176183 A1 | 6/2017 | Steinbach et al. | |
| 2017/0212065 A1 | 7/2017 | Rud et al. | |
| 2018/0003655 A1 | 1/2018 | Rud et al. | |
| 2018/0052086 A1 * | 2/2018 | Murphy | G01N 29/4427 |
| 2019/0339298 A1 * | 11/2019 | Bonanomi | G01F 1/688 |
| 2020/0150064 A1 * | 5/2020 | Rud | G01N 25/18 |
| 2020/0225096 A1 | 7/2020 | Ude et al. | |
| 2020/0408580 A1 | 12/2020 | Gebhardt et al. | |
| 2020/0408611 A1 | 12/2020 | McCulloch et al. | |
| 2021/0181032 A1 | 6/2021 | Gebhardt et al. | |
| 2021/0199577 A1 | 7/2021 | Scott et al. | |
| 2021/0199636 A1 | 7/2021 | McKee et al. | |
| 2021/0265772 A1 | 8/2021 | Ix | |

FOREIGN PATENT DOCUMENTS

| | | | | |
|---|---|---|---|---|
| CN | 107407590 A | | 11/2017 | |
| DE | 102010030075 A1 | | 12/2011 | |
| GB | 002207759 A | | 2/1989 | |
| GB | 002500034 A | | 9/2013 | |
| JP | H05291005 A | * | 11/1993 | |
| JP | 2734840 B2 | * | 4/1998 | |
| WO | WO-0039540 A1 | * | 7/2000 | G01F 23/22 |
| WO | WO-2012174050 A1 | * | 12/2012 | E21B 47/00 |
| WO | WO 2019/143929 A1 | | 7/2019 | |

OTHER PUBLICATIONS

International Search Report and Written Opinion PCT/US2019/014183, dated Mar. 27, 2019.

European Search Report EP 19741208.3 dated Sep. 23, 2021.

Chinese Office Action dated Dec. 27, 2022 in 201980016361.6.

* cited by examiner

FAST RESPONSE TEMPERATURE SENSORS

CROSS-REFERENCE TO RELATED APPLICATIONS

This application is a continuation of U.S. application Ser. No. 16/251,641, filed Jan. 18, 2019, which application claims the benefit of and priority to U.S. Provisional Patent Application No. 62/619,009 filed Jan. 18, 2018, both of which are incorporated by reference herein in their entireties.

BACKGROUND OF INVENTION

Fluid monitoring and analysis plays a key role in a variety of industries including aquaculture, oil and gas, mining, environmental analysis or any industry in which fluid parameters play a role in design or operations. Temperature is often an important parameter for a variety of applications and analyses.

Accurate temperature measurement of a fluid body is often complicated by the thermal effect of the sensor itself when immersed in the fluid. For example, an instrument taken from a hot environment (e.g., inside a vehicle on a warm day into relatively cold water), will initially yield highly inaccurate temperature measurement. To compensate for the thermal differences between the sensor and fluid, and any effect caused by the instrument itself, the temperature must be given time to stabilize, which is referred to as temperature response time. Commonly, temperature response time can be as high or higher than 20 minutes, depending on temperatures, the sensor size, and desired accuracy of the temperature reading. A high response time results in inefficiencies, including arising from increased operator time as they await temperature stabilization.

Currently, some conventional sonde designs reduce temperature response time to some extent. For example, sondes may use a long skinny temperature sensor that extends into the water so the heat transfer of the surrounding water is much larger than the heat transfer from the instrument's thermal mass. This can give good results and take temperature stabilization down to a couple of minutes, but such conventional sonde temperature sensors take up a lot of space and tend to be more prone to bending and breaking. Elongated temperature sensors also are hard to use with modern wiper cleaning systems.

Other known sondes may employ predictive temperature measurement. In such known systems and methods, predictive temperature measurement involves taking multiple temperature readings over time and using a predictive algorithm to determine a steady state temperature. That method uses sequential readings taken over time and it looks at the difference from one reading to another reading to predict what the reading will be when the temperature stabilizes. These sondes have a temperature sensor that is embedded in the end of the sonde and has no metal-to-fluid contact with the surrounding water.

It can be seen from the foregoing that there remains a need in the art for temperature sensors with improved response time to allow for accurate readings to be taken more frequently and efficiently.

SUMMARY OF THE INVENTION

Provided herein are temperature probes having reduced temperature response time so that an accurate and reliable temperature is rapidly obtained. This is achieved by special positioning of a temperature sensor that measures liquid temperature and a thermal barrier that thermally isolates the temperature sensor from the rest of the temperature probe. Further improvements are achieved with a multiple-temperature sensor configuration to quickly and accurately calculate ambient fluid temperature with a reduced response time. Systems and methods may utilize a first fluid temperature sensor to measure fluid (e.g., liquid water) temperature and a second device temperature sensor to account for the thermal impact of the device or probe on the ambient fluid temperature and the effect of heat within the device or probe on the fluid sensor measurement. This configuration may be generally referred to as a differential temperature sensor.

The thermally isolated liquid temperature sensor ("first temperature sensor") from the rest of the probe or device provides a number of advantages. The temperature sensor may be associated with a relatively small thermal mass, so that the thermal history of the temperature is minimized. The temperature sensor may be geometrically configured to maximize surface area exposure to surrounding fluid, thereby further increasing response time. The thermal isolation also minimizes the thermal impact of other parts of the probe, including power sources, electronics on the temperature measurement, and a second temperature sensor that measures temperature of the device is thermally isolated from the first temperature sensor. The second temperature sensor provides further improvements in temperature response times.

The described probes and sensors are versatile and may be used with a variety of fluids, including water, in a range of applications, such as surface, deep water, aquifer, well or other applications. The systems and methods may be useful in both still and flowing fluid bodies, including immersion from a fixed location into still or flowing water, or trolling from a moving vehicle, such as a boat, into water.

Any of the probes provided herein may be stand-alone devices or may, in turn, be incorporated within another device. For example, the probe may part of a sensor, such as a sonde sensor or a multiparameter sonde having a plurality of sensors, with at least one sensor a temperature sensor that corresponds to any of the probes provided herein. Specific examples of sonde sensors and multiparameter sondes are provided in any one or more of: U.S. Pat. No. 9,689,855; 2016/0146777; U.S. Pat. Nos. 9,835,554; 9,778,180; 2017/0176183; and D755655, which are specifically incorporated by reference herein for the sonde sensors, sonde bases, multiparameter sondes, and associated components.

Provided herein is a temperature probe having a fast response time for measuring water temperature, comprising: i) an instrument housing forming an interior volume and having a distal end; ii) a first temperature sensor positioned at or extending from the distal end of the instrument housing; iii) a second temperature sensor positioned in the interior volume of said instrument housing; and iv) a thermal barrier thermally positioned between said first temperature sensor and said instrument housing to thermally isolate the first temperature sensor from the instrument thermal mass.

The insulation layer may comprise an ultralight superinsulating material formed of one or more of ceramics, polymers, carbon, metals, carbides, such as an aerogel, including AIRLOY® aerogel (Aerogel Technologies www.airloy.com).

Also provided herein are methods for determining the temperature of a fluid using any of the devices or probes described herein. For example, the method may comprise the steps of: a) immersing a temperature probe in a fluid, wherein said probe comprises: i) a first fluid temperature sensor positioned at a distal end of the temperature probe; and ii) a second instrument temperature sensor positioned within an internal volume of the probe; b) determining a ratio ($R_1/R_2$) of thermal resistivity between the first temperature sensor and a surrounding fluid ($R_1$) and the second temperature sensor and the first temperature sensor ($R_2$); c) measuring a first temperature with the first temperature sensor; d) measuring a temperature probe temperature with the second temperature sensor; and e) determining the fluid temperature based on the measured first temperature, the measured instrument temperature, and the ratio $R_1/R_2$. The $R_1/R_2$ ratio may be empirically determined, including by the manufacturer for various conditions, by the user, or by the instrument immediately before or during use.

Also provided is a temperature probe having a fast response time for measuring water temperature, comprising: i) an instrument housing forming an interior volume and having a distal end; ii) a first temperature sensor positioned at or extending from the distal end of the instrument housing; and iii) a thermal barrier thermally positioned between said first temperature sensor and said instrument housing to thermally isolate the first temperature sensor from the instrument thermal mass.

Exemplary claims are provided herein, and include, but are not limited to, the following specific non-limiting embodiments:

1. A temperature probe having a fast response time for measuring a fluid temperature, comprising: an instrument housing forming an interior volume and having a distal end; a first temperature sensor positioned at or extending from the distal end of the instrument housing; a second temperature sensor positioned in the interior volume of said instrument housing; and a thermal barrier thermally positioned between said first temperature sensor and said instrument housing to thermally isolate the first temperature sensor from the instrument thermal mass.

2. The temperature probe of embodiment 1, further comprising: a sensor platform having a distal end and a proximal end, wherein said first temperature sensor is positioned at said sensor platform distal end and said sensor platform proximal end is connected to or passes through said instrument housing distal end.

3. The temperature probe of embodiment 2, wherein said instrument housing comprises a sonde base and said sensor platform comprises a sonde sensor configured to operably connect to said sonde base.

4. The temperature probe of embodiment 2 or 3, wherein said second temperature sensor is positioned within said sensor platform or within said sonde base.

5. The temperature probe of any of embodiments 1-4, wherein said thermal barrier comprises an insulation layer positioned between said first temperature sensor and said second temperature sensor, thereby thermally isolating said second temperature sensor from said first temperature sensor.

6. The temperature probe of any of embodiments 1-5, wherein said first temperature sensor is part of a sensor platform having a distal end for sensing a fluid temperature and a proximal end connected to the instrument housing, wherein said insulation layer at least partially surrounds said proximal end of said sensor platform.

7. The temperature probe of any of embodiments 1-6, wherein said insulation layer comprises a rigid aerogel.

8. The temperature probe of any of embodiments 1-7, wherein said insulation layer comprises an ultralight superinsulating material formed of one or more of a ceramic, a polymer, a carbon-containing material, a metal, a carbide or any combination thereof.

9. The temperature probe of any of embodiments 1-8, wherein said thermal barrier has a thermal conductivity of between 18-35 mW/m-K.

10. The temperature probe of any of embodiments 1-9, further comprising an electronic assembly and a potting material positioned in said interior volume, wherein said second temperature sensor is positioned in said potting material.

11. The temperature probe of embodiment 10, wherein said potting material comprises a solid and/or gelatinous compound such as a thermoset plastic and/or silicone rubber gel.

12. The temperature probe of any of embodiments 1-11, wherein said second temperature sensor is positioned along a centerline axis of said interior volume of said instrument housing.

13. The temperature probe of any of embodiments 3-4, wherein said first temperature sensor is separated from said sonde base by a separation distance that is greater than or equal to 1 cm and less than or equal to 50 cm.

14. The temperature probe of any of embodiments 1-14, wherein the fast temperature response time is characterized as coming to 90% or better of a final temperature value when submerged in a fluid for less than 2 minutes and the temperature probe has a temperature accuracy of ±0.2° C. or better.

15. The temperature probe of any of embodiments 1-14, further characterized in having a temperature response time of 90% or better of a final value when submerged in a fluid for less than 20 seconds and the temperature probe has a temperature accuracy of ±0.2° C. or better.

16. The temperature probe of any of embodiments 1-15, further comprising a processor operably connected to said first temperature sensor and to said second temperature sensor, wherein during use in a liquid environment, said processor receives a first temperature output from said first temperature sensor and a second temperature output from said second temperature sensor and determines a liquid temperature of the surrounding liquid environment.

17. The temperature probe of embodiment 16, wherein said processor determines fluid temperature based on the formula:

$$T_{Fluid} = \frac{R_1}{R_2} * (T_1 - T_2) + T_1$$

wherein:

$T_{Fluid}$ is fluid temperature, $T_1$ is said first temperature output from said first temperature sensor, $T_2$ is said second temperature output from said second temperature sensor, $R_1$ is a thermal resistivity between said first temperature sensor and said fluid; and $R_2$ is a thermal resistivity between said first temperature sensor and said second temperature sensor.

18. The temperature probe of embodiment 17, wherein $R_1/R_2$ is empirically determined prior to use.

19. The temperature probe of any of embodiments 17-18, wherein $R_1/R_2$ has a value that is greater than or equal to 0.05 and less than or equal to 0.5.

20. The temperature probe of any of embodiments 1-19, wherein the first temperature sensor is separated from the instrument housing by a separation distance formed of a high surface area and thin-walled thermal conductor.

21. The temperature probe of embodiment 20, wherein said thin-walled thermal conductor has a thickness that is greater than or equal to 0.1 mm and less than or equal to 1 cm.

22. The temperature probe of any of embodiments 20-21, wherein said thin-walled thermal conductor comprises titanium.

23. The temperature probe of embodiment 3 that is part of a multiparameter sonde comprising a plurality of independent sonde sensors, each operably connected to said sonde base.

24. A method for determining the temperature of a fluid comprising the steps of: immersing a temperature probe in a fluid, wherein said probe comprises: a first temperature sensor positioned at a distal end of the temperature probe; a second temperature sensor is positioned within an internal volume of the probe; determining a ratio ($R_1/R_2$) of thermal resistivity between the first temperature sensor and a surrounding fluid ($R_1$) and the second temperature sensor and the first temperature sensor ($R_2$); measuring a first temperature with the first temperature sensor; measuring a probe temperature with the second temperature sensor; and determining the fluid temperature based on the measured first temperature, the measured probe temperature, and the ratio $R_1/R_2$.

25. The method of embodiment 24, wherein said step of determining said fluid temperature is performed using the formula:

$$T_{Fluid} = \frac{R_1}{R_2} * (T_1 - T_2) + T_1$$

wherein $T_{Fluid}$ is the fluid temperature, $T_1$ is the first temperature, and $T_2$ is the probe temperature.

26. The method of any of embodiments 24-25, further comprising the step of thermally isolating the first temperature sensor from the second temperature sensor.

27. The method of any of embodiments 24-26, said temperature probe characterized in having a temperature response time to 90% of final value that for an immersion time that is less than or equal to 20 seconds and a temperature accuracy that is within 0.2° C.

28. A temperature probe having a fast response time for measuring fluid temperature, comprising: an instrument housing forming an interior volume and having a distal end; a first temperature sensor positioned at or extending from the distal end of the instrument housing; and a thermal barrier thermally at least partially positioned between said first temperature sensor and said instrument housing to thermally isolate the first temperature sensor from the instrument housing.

29. The temperature probe of embodiment 28, further comprising a sensor platform having a distal end and a proximal end, wherein said first temperature sensor is positioned at said sensor platform distal end and said sensor platform proximal end is connected to said instrument housing distal end.

30. The temperature probe of any of embodiments 28-29, wherein the thermal barrier at least partially surrounds said proximal end of said sensor platform.

31. The temperature probe of any of embodiments 28-30, wherein said thermal barrier comprises a rigid aerogel.

32. The temperature probe of any of embodiments 28-31, wherein the thermal barrier comprises an ultralight super-insulating material formed of one or more of a ceramic, a polymer, a carbon-containing material, a thermally insulative metal, a carbide or a combination thereof and having a thermal conductivity of between 18-35 mW/m-K.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

In general, the terms and phrases used herein have their art-recognized meaning, which can be found by reference to standard texts, journal references and contexts known to those skilled in the art. The following definitions are provided to clarify their specific use in the context of the invention.

"Distal" and "proximal" refers to directions that are toward or away from an instrument body. For example, the temperature sensor for measuring liquid temperature, such as water temperature, is said to distally located, on or toward a distal sensing end. The temperature sensor used to measure the probe temperature is said to be located proximally to the fluid-measuring temperature sensor.

"Thermal barrier" refers to a material that is a thermal insulator and positioned so as to reduce heat flow from one region to a second region. "Thermally isolate" refers to the position of a thermal barrier between components, so that heat transfer between components is retarded. For example, the thermal barrier may reduce thermal conductivity by about 50%, 75%, 90%, 95%, 99% or greater. The invention is compatible with any number of thermal barrier materials, including those having a thermal conductivity between about 18 and 35 mW/M-K, such as an aerogel, a ceramic, a polymer, a carbon-containing material, carbides, and any combination thereof.

"Sonde" refers to an instrument that measures one or more water properties. The sonde may be a multiparameter sonde with a plurality of independent sonde sensors, including with any of the devices and methods described herein, including for use with any of the sondes and components described in U.S. Pat. Nos. 9,689,855, 9,835,554, 9,778,180 and D755,655, each of which are specifically incorporated by reference herein in their entireties to the extent not inconsistent herewith. The plurality of independent sonde sensors of such multiparameter sondes may include at least one sonde sensor having a temperature sensor that incorporates any of the systems described herein to achieve fast response time for liquid temperature measurement. Generally, the first temperature sensor for measuring liquid temperature is at the distal sensing end of the sonde sensor. The second temperature sensor, used to measure temperature of the instrument, may be positioned within the same sonde sensor having the first temperature sensor, or may be positioned even further away, such as in another portion of the sonde, such as a base unit to which the sonde sensor(s) operably connect.

"Fast response time" refers to a temperature probe of the instant invention that has an at least 50%, at least 70%, at least 90%, and up to at least 98% improvement in temperature measurement response time compared to a conventional temperature sensor without the instant dual-temperature sensor design and configuration, such as an equivalent sensor with only a single temperature sensor that is not thermally isolated and/or does not have a second temperature sensor for measuring probe-body temperature.

"Temperature sensor" refers to a component that measures temperature. The systems and methods provided herein are compatible with any of a wide range of sensor types, such as thermistors, thermocouples, resistance thermometer such as a platinum resistance thermometer, silicon bandgap temperature sensor and the like.

A temperature probe (2) having a faster response time as compared to conventional temperature probes for measuring fluid temperature, along with associated methods for measuring fluid temperature, are shown and described with reference to FIGS. 1-3, 6A and 6B. Temperature probe (2) includes an instrument housing (4) forming an interior volume (6). Instrument housing (4) has a distal end (8). Temperature probe (2) includes a first temperature sensor (10), with active sensing element illustrated as thermistor (48), positioned at and/or extending from the distal end (8) of the instrument housing (4). Temperature probe (2) includes a second temperature sensor (12) positioned in the interior volume (6) of the instrument housing (4). A thermal barrier (14) is thermally positioned between the first temperature sensor (10) and the second temperature sensor (12) in the instrument housing (4). Thermal barrier (14) thermally isolates the first temperature sensor (10) from the rest of the "thermally heavy" instrument thermal mass (e.g., the thermal mass of the temperature probe (2), including as generated in and/or conducted along, the interior volume (6)). As an example, the thermal barrier (14) may have a thermal conductivity of between 18-35 mW/m-K. Optionally, the instrument housing may comprise a distal surface that covers the thermal barrier and ensures a water-tight seal around the instrument housing and the temperature sensing-portion of the probe. The distal surface may itself be a thermal insulated, minimizing conduction of heat from housing (4) and interior volume (6) to the temperature sensor (10). As desired, the surface that covers the temperature sensor (10) may be formed of a thermal conductor, for those surfaces exposed to liquid, and a thermal insulator, for those surfaces in contact with the instrument housing (4) and/or the thermal barrier (14).

Figure 6A:
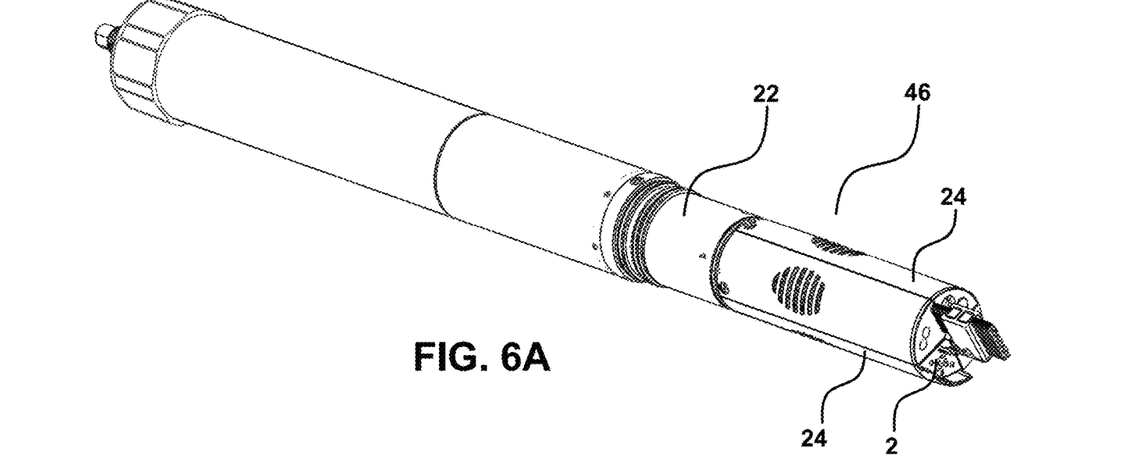
FIG. 6A is a perspective view of a multiparameter sonde having a plurality of sensors including any of the fast-response temperature probes described herein.
Figure 6B:
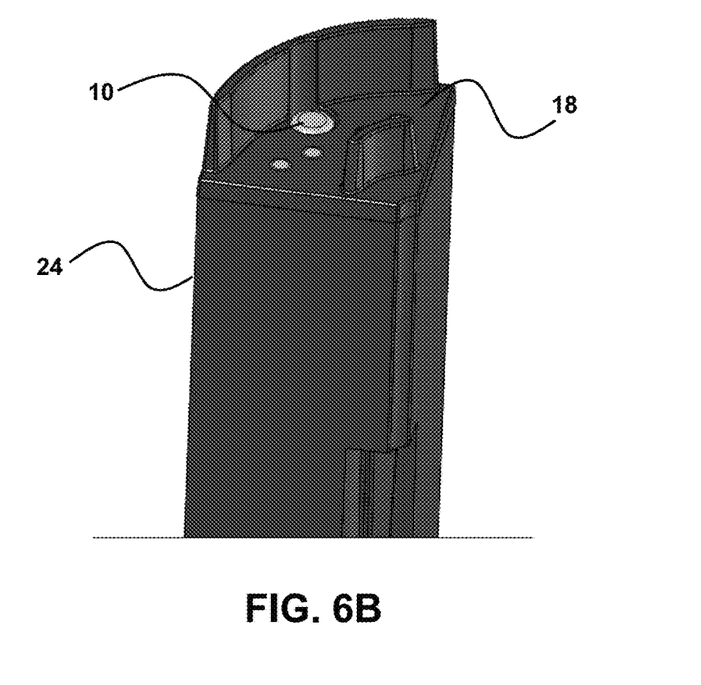
FIG. 6B is a close up view of the distal end of a temperature sensor ("first" temperature sensor) of the fast-response temperature probe of FIG. 6A. Adapted from U.S. Pat. No. 9,835,554.

Temperature probe (2) may include a sensor platform (16) extending a longitudinal distance $D_{sen}$ having a distal end (18) and a proximal end (20). The first temperature sensor (10), specifically active senor component (48), may be positioned toward the sensor platform (16) distal end (18), and the proximal end (20) of the sensor platform (16) is connected to, including, as illustrated, passing through the distal end (8) of the instrument housing (4). Referring to FIG. 6A and 6B, the platform itself may be part of a sensor housing, such as sonde sensor (24) housing having a platform corresponding to distal end (18) to support the temperature sensor (10) positioned away from the probe and sensor body and toward the fluid. The probe (2) provided herein may be incorporated entirely in a sonde sensor (24), or a portion in the sonde sensor (24) (e.g., first temperatures sensor) and another portion in the sonde base (22) (e.g., second temperature sensor, and associated electronics).

Second temperature sensor (12) may be positioned in various locations, depending on the application of interest. For example, referring to FIGS. 6A and 6B, second temperature sensor may be positioned in a sonde base (22), and the sensor platform (16) includes a sonde sensor (24) configured to operably connect to the sonde base (22). The second temperature sensor (12) may also be positioned within the sonde sensor housing. In other words, the probe illustrated in FIG. 1 may be incorporated entirely within sonde sensor (24), or, alternatively, the second sensor may be further removed from the first sensor and positioned in a sonde base (22). This illustrates that the term "instrument housing" (4) is intended to be used broadly, and may refer to housing of sonde sensor (24) and/or sonde base (22). The common aspect is that a thermal barrier is positioned to thermally isolate first temperature sensor (10) from the rest of the probe, device or system, including from second temperature sensor (12) that measures the temperature of rest of the probe/device that is thermally isolated from the first temperature sensor. The different relative locations of the temperature sensors $T_1$ and $T_2$ are reflected by corresponding different values of $R_1/R_2$.

The thermal barrier (14) of temperature probe (2) may include an insulation layer (26) positioned between the first temperature sensor (10) and the second temperature sensor (12). Positioning the thermal barrier (14) between the first (10) and second (12) temperature sensors thermally isolates the two temperature sensors (10, 12) from one another, including first temperature sensor (1) that measures liquid temperature and second temperature sensor (12) that measures the rest of the probe temperature (e.g., the temperature in the interior volume (6) of instrument housing (4)). The insulation layer (26) may surround the proximal end (20) of the temperature sensor (10) and/or sensor platform (16).

As one example, the insulation layer (26) may include a rigid aerogel. As another example, the insulation layer (26) may include an ultralight superinsulating material. The ultralight superinsulating material may be formed of one or more of ceramics, polymers, carbon, metals, carbides or any combination thereof.

The temperature probe (2) may include an electronic assembly (28) and a potting material (30) (schematically illustrated by the dotted pattern in FIG. 1) positioned in said interior volume (6). The second temperature sensor (12) may be positioned in the potting material (30), either as an integral part of or as a separate component from, the electronic assembly (28). The second temperature sensor (12) may be positioned along a centerline axis (32) of the interior volume (6) of the instrument housing (4). As an example, the potting material (30) may include a solid compound, a gelatinous compound, or both of those types of materials. Such potting materials (30) may include one or both of a thermoset plastic and a silicon rubber gel.

The first temperature sensor (10) may be separated longitudinally (e.g., along centerline axis (32)) from the second temperature sensor (12) by a separation distance (34). As an example, the separation distance (34) may be greater than or equal to 1 cm and less than or equal to 50 cm. The first temperature sensor (10) may be separated laterally or radially (e.g., perpendicular to centerline axis (32)) from an opening (54) in the instrument housing (4) and/or sensor platform (16) by a separation distance (42). As an example, the separation distance (42) may be between 0.1 mm and 1 cm. The separation distance (42) may be provided by the material of construction of a thin-walled thermal conductor (44) which covers at least a portion of the length (56) and a probe end region (58) of the first temperature probe (10). The thin-walled thermal conductor (44) may have a thickness that is equal to or about equal to separation distance (42). For instance, the thickness of thin-walled thermal conductor (44) may be between 0.1 mm and 1 cm. The thin-walled thermal conductor (44) may have a thickness that varies across length (56) and/or probe end region (58) of first temperature probe (10). The thin-walled thermal conductor (44) may be formed from a thermally-conductive material, including titanium and, optionally, may have a proximal end that is formed of a thermally insulative material, such as a plastic, including those portions that are in the instrument housing and not exposed to liquid during use.

Figure 1:
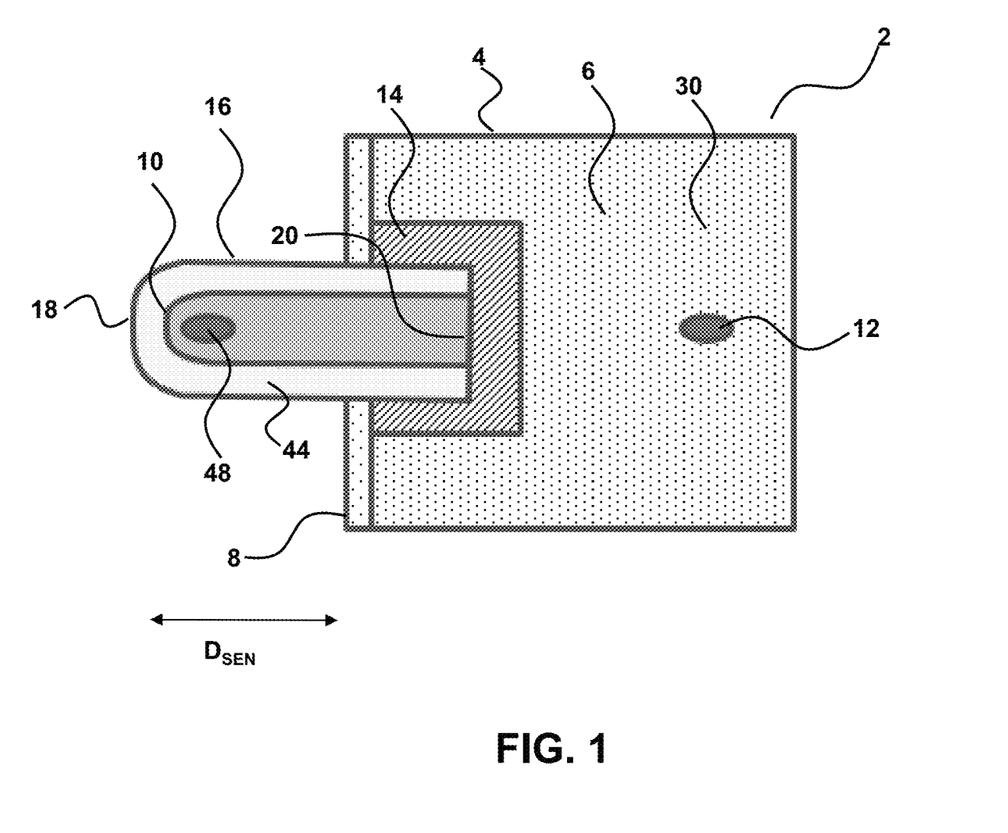
FIG. 1 is a cross-sectional view of a temperature probe having two temperature sensors, with a first temperature sensor (e.g., a sensor thermistor) for measuring a temperature in a liquid surrounding the probe and a second temperature sensor (e.g., an instrument thermistor) for measuring the temperature of the probe instrument. The temperature sensors are thermally isolated from each other.
Figure 2:
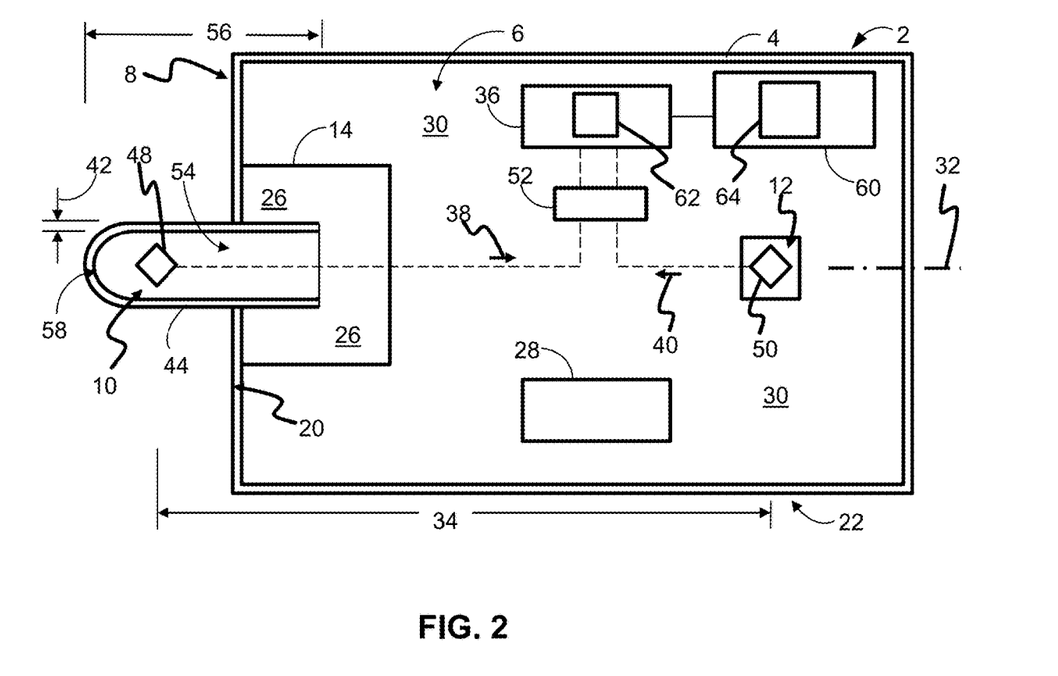
FIG. 2 is a schematic cross-sectional view of a dual temperature probe.

Covering the length (56) and probe end region (58) of first temperature probe (10) in the manner illustrated in FIG. 2 effectively increases a surface area of first temperature probe (10). In addition to the high surface area provided by the thin-walled thermal conductor (44), covering first temperature probe (10) in this fashion provides protection and structural stability to first temperature probe (10) and to those other components of temperature probe (2) to which first temperature probe (10) is attached and/or connected.

The temperature probe (2) may include a processor (36) operably connected to the first (10) and second (12) temperature sensors. During use (e.g., as submerged in a fluid such as water) of first temperature sensor in a liquid environment, the processor (36) receives a first temperature output (38) from the first temperature sensor (10). In addition, during use of temperature probe (2), processor (36) receives a second temperature output (40) from the second temperature sensor (12). First (38) and second (40) temperature outputs may include an analog signal (e.g., a voltage or a current) that is linearly or non-linearly related to a sensed temperature from first (10) and second (12) temperature sensors, and processor (36) may include analog-to-digital (ADC) conversion functionality. As an example, temperature probe (2) may include a data storage device, such as memory (60), and/or transmitter, for storing and/or transmitting measured temperatures as digital numerical values corresponding to the sensed voltage and/or current of first (38) and second (40) temperature outputs.

Processor (36) can determine a liquid temperature of the surrounding liquid environment adjacent to the first temperature sensor (10), including water. As an example, processor (36) includes a central processing unit (CPU) (62) having an arithmetic logic unit (ALU) to perform numerical computations, including using the aforementioned digital numerical input values stored in memory (60) and/or transmitted by transmitter, including a wireless transmitter module that may be part of the CPU, such as a Bluetooth module. The results of such numerical computations may themselves be stored in memory (60), to be made available, along with the raw input values and/or sensed analog voltages and/or currents, for further manipulations, display, cataloguing, analysis, reporting, transmission, storage, and any other useful end of interest to users of the disclosed temperature probe (2). In such embodiments, memory (60) may include a non-transient processor (36)-readable medium (64) storing processor-executable instructions therein for performing and/or otherwise facilitate implementing the disclosed methods (e.g., method (100) shown in FIG. 7) for determining the temperature of a fluid using a temperature probe (2).

In an example, processor (36) may be positioned on or in the electronic assembly (28), including for example, as part of a printed circuit board (PCB). Alternatively, processor (36) may be replaced or augmented with other digital and/or analog circuitry, including, for example, an application specific integrated circuit (ASIC), as well as such other electronic components known to persons having ordinary skill in the art.

Alternatively, or in addition to, ADC functionality and/or numerical computations being performed by a processor (36), sensed analog voltages and/or currents from first (10) and/or second (12) temperature sensors may be transmitted elsewhere (e.g., by wired and/or wireless data communication protocol(s)) for further manipulation and/or storage. For example, and as shown in FIG. 6A, the temperature probe (2) may be part of a multiparameter sonde (46) having a plurality of independent sonde sensors (24), each independently and operably connected to a sonde base (22). Such multiparameter sondes (46) may include the disclosed temperature probe (2). The multiparameter sonde (46) may include processor(s) and/or memory of its own, which carry out the functionality of the processor (36) and memory (60), as described above, including within base portion (22).

The processor (36) of the temperature probe (2) may determine the fluid temperature based on the formula:

$$T_{Fluid} = \frac{R_1}{R_2} * (T_1 - T_2) + T_1$$

wherein:

$T_{Fluid}$ is the temperature of the probed fluid (e.g., water);
$T_1$ is the first temperature output (38) from the first temperature sensor (10) ($T_{Sensor}$ of FIG. 3);
$T_2$ is the second temperature output (40) from the second temperature sensor (12) ($T_{Instrument}$ of FIG. 3);
$R_1$ is a thermal resistivity between the first temperature sensor (10) and the probed fluid ($R_{Sensor}$ of FIG. 3); and
$R_2$ is a thermal resistivity between the first temperature sensor (10) and the second temperature sensor (12) ($R_{Instrument}$ of FIG. 3).

In an embodiment, the fluid temperature ($T_{Fluid}$) is determined in a determining (110) step of method (100), as shown and described below with reference to FIG. 7. In an embodiment, the ratio $R_1/R_2$ is empirically determined prior to use (e.g., deployment for submerging in fluid) of temperature probe (2). The value of the ratio $R_1/R_2$ may be between 0.05 to 0.5. In an embodiment, the value of the ratio $R_1/R_2$ is determined in a determining (104) step of method (100), as shown and described below with reference to FIG. 7.

In practice of the disclosed method (100) using temperature probe (2), when temperature probe (2) is submerged in a fluid, a temperature response time to 90% or better of a final temperature value is achieved in less than 2 minutes and with a temperature accuracy of ±0.2° C. As an example, practicing the disclosed method (100) using temperature probe (2) enables achieving, for the fluid submerged temperature probe (2), a temperature response time to 90% or better of a final temperature value in less than 20 seconds and with a temperature accuracy of ±0.2° C. Such rapid response times with corresponding highly accurate temperature read-outs are a significant improvement compared to conventional temperature sensors, including temperature sensors used in sondes.

Figure 7:
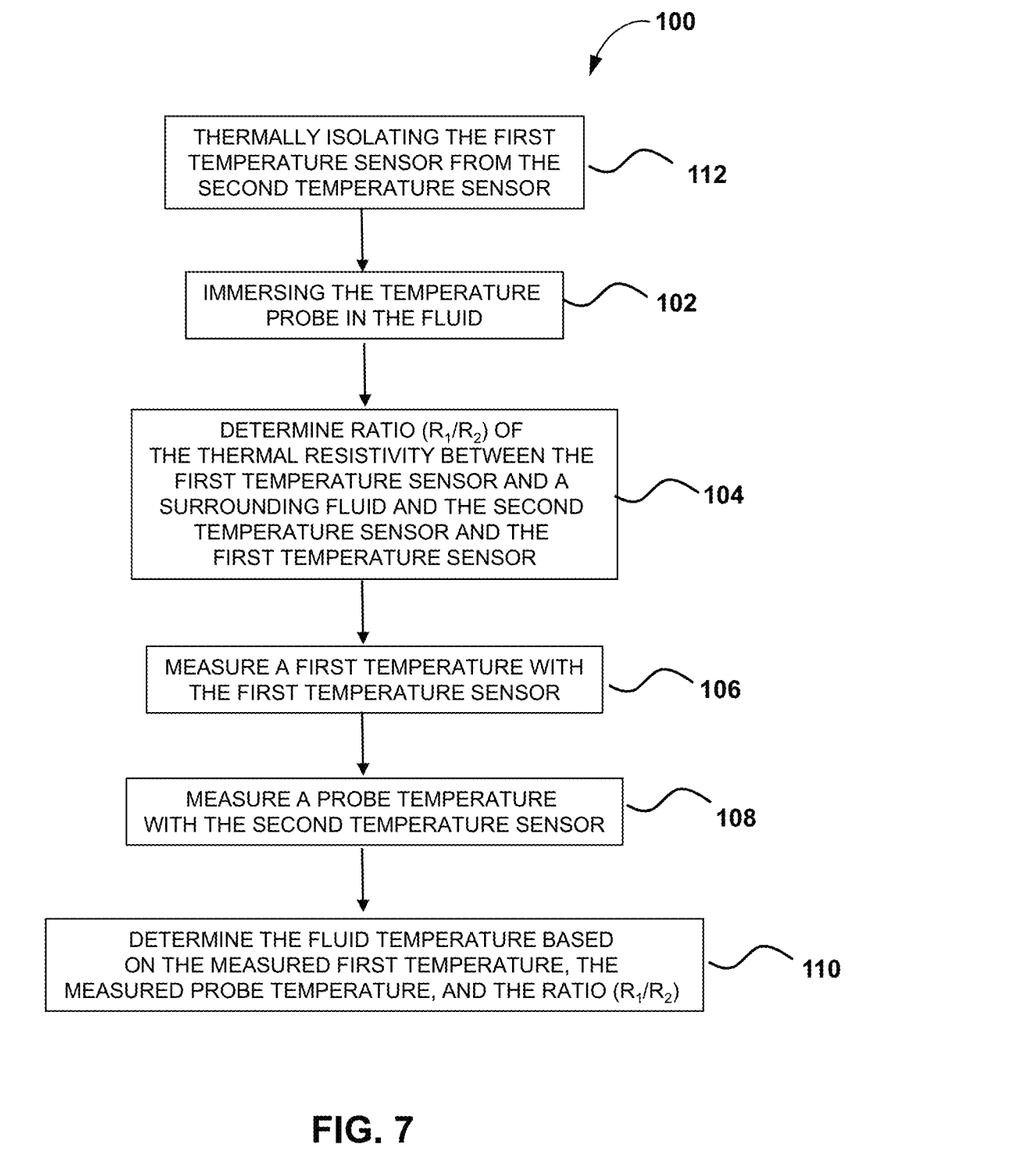
FIG. 7 is a flow chart of a method for determining the temperature of a fluid in accordance with an embodiment of the disclosure.

Referring now to FIG. 7, a method (100) for determining the temperature of a fluid includes immersing (102) the disclosed temperature probe (2) in the fluid. Method (100) includes determining (104) a value of the ratio (e.g., $R_1/R_2$) of thermal resistivity between the first temperature sensor (10) and a surrounding fluid ($R_1$) and the second temperature sensor (12) and the first temperature sensor (12) ($R_2$). This value may be empirically determined either ahead of time or immediately before or during measurement. Method (100) includes measuring (106) a first temperature (e.g., $T_1$) with the first temperature sensor (10). Method (100) includes measuring a probe (2) temperature ($T_2$) with the second temperature sensor (12). Method (100) includes determining (110) the fluid temperature ($T_{Fluid}$) based on the measured first temperature ($T_1$), the measured probe (2) temperature ($T_2$), and the ratio $R_1/R_2$. The method (100) may include thermally isolating (112) the first temperature sensor (10) from the second temperature sensor (12).

Example: Fast Response Differential Temperature Sensor: Described herein is a unique fast response temperature probe (2) that uses two temperatures sensors (e.g., first (10) and second (12) temperature sensors) to determine the fluid temperature based on the difference between strategically placed temperature sensing elements. Such a configuration provides the ability to accurately and reliably measure fluid temperature at a comparatively much a faster time than a conventional temperature sensor.

A common issue for water quality sensors is slow temperature response time.

For conventional temperature probes that are moved from one site to another this can be a big issue because the user must wait for the temperature sensor to stabilize before they can collect data. For some instruments, the temperature readings can take up to 20 minutes to stabilize. Over the course of a day's work this can cause hours of delay. The devices and methods described herein reduce temperature sensor response time by up to 98%, including from between 80% and 98%, for example, reducing response time from 20 minutes to 20 seconds or less.

The improved design described herein greatly improves temperature response time. The improved design may include, for example, a thermal barrier (14) formed of an insulative material that is referred to as "airloy", which is a more rigid version of aerogel. This material has extremely good thermal insulation properties that have not been previously available. This material is useful in isolating the thermal mass of the rest of the temperature probe (2) from the first temperature sensor (10). The insulative material resists the heat transfer from the thermal mass of the temperature probe (2) to the temperature sensing element (e.g. thermistor) of the first temperature sensor (10). The temperature sensing element of the first temperature sensor (10) is also positioned further into the fluid sample so there is higher surface area and thinner wall sections. This increases the thermal heat transfer from the fluid to the temperature sensing element of the first temperature sensor (10). This design significantly reduces the response time, including from 20 to 2 minutes, at least in part, due to the new insulation and by extending the temperature sensing element of the first temperature sensor (10) further into the fluid sample.

While two minutes is an improvement over conventional sonde temperature sensors, the response time can be even further reduced by introducing a second temperature sensor (12) that is placed inside potting material (30) positioned in an interior volume (6) of an instrument housing (4) of the temperature probe (2). The second temperature sensor (12) is used to measure the temperature of the potting material (30) in the interior volume (6), which holds a lot of thermal mass. Since there are two temperature sensors—the first (10) and the second (12) sensors—how the thermal mass of the temperature probe (2) interior volume (6) affects the measurements of the first temperature sensor (10) (that is in close proximity to the water sample) may be determined. This can improve response time from 2 minutes to a matter of seconds, for example, 20 seconds or less.

Technical Description and Experimental Results

Figure 3:
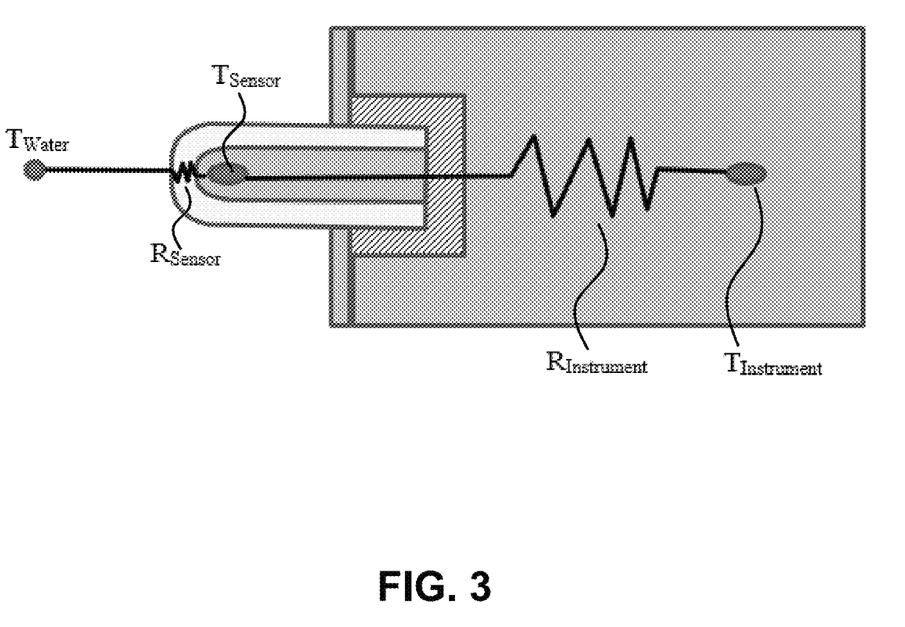
FIG. 3 is a schematic diagram illustrating a thermal circuit model of the dual temperature probe shown in FIGS. 1-2.
Figure 4:
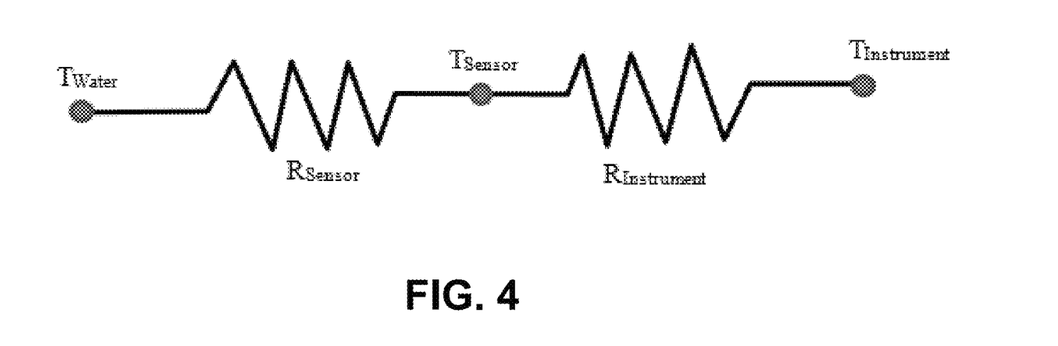
FIG. 4 is a reduced thermal circuit model from FIG. 3.
Figure 5:
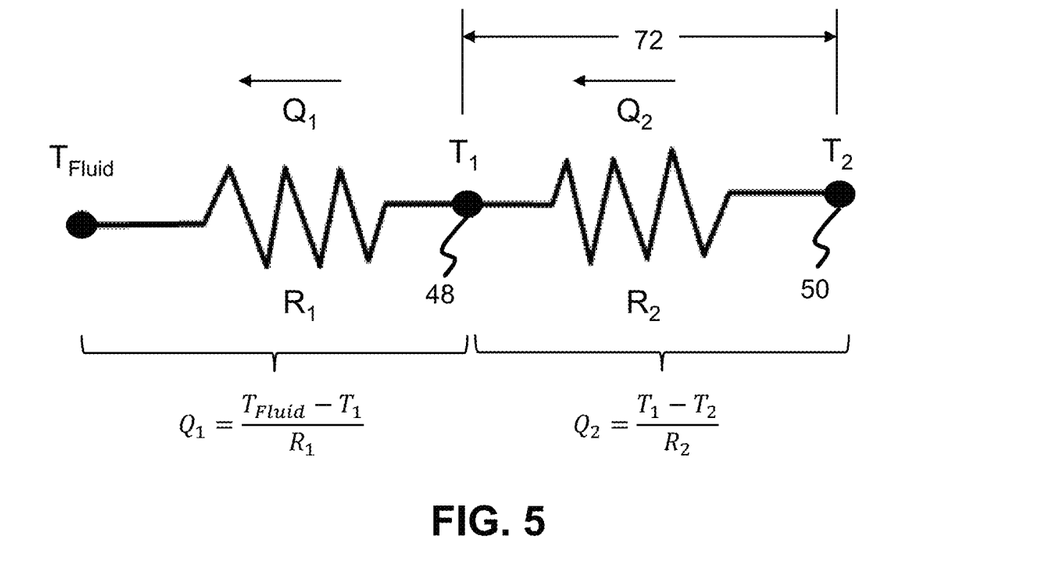
FIG. 5 is a corresponding mathematical model from the circuit of FIG. 4.

FIG. 2 is a schematic diagram illustrating a cross-sectional view of a dual temperature probe (2) in accordance with an embodiment of the disclosure. FIGS. 3-5 are schematic diagrams illustrating a thermal circuit model of the dual temperature probe (2) shown in FIGS. 1-2. The heat transfer of the temperature probe (2) shown in FIG. 4 is modeled using Fourier's Law, as shown in FIG. 5. In the following discussion, some electric circuit analogies are made to the thermodynamic system of FIG. 5 to simplify the analysis.

TABLE 1

Variable analogies between electrical and thermal systems

| Electrical System | Heat Transfer System |
|---|---|
| Voltage (V) | Temperature delta ($T_1$-$T_2$) |
| Current (I) | Heat flux (heat flow rate) |
| Resistance (R) | Thermal resistance (R) |

FIG. 5 depicts an application of the electrical/thermal analogy to the design shown in FIG. 4. Using anologies, one can model a simple resistor in series to represent the heat transfer.

The conduction heat transfer is described by equation 1:

$$Q = \frac{kA(T_1 - T_2)}{d} \qquad \text{(Equation 1)}$$

Where: Q=heat transfer per unit time
k=thermal conductivity
A=area
$T_1$=temperature value reported by first temperature sensor (10)
$T_2$=temperature reported by second temperature sensor (12)
d=distance (72) between first (48) and second (50) thermistors Resistance components of the conduction heat transfer are described in equation 2:

$$\frac{1}{R_1} = \frac{kA}{d} \text{ or } \frac{1}{R_2} = \frac{kA}{d} \qquad \text{(Equation 2)}$$

Where: $R_1$=thermal resistivity between the first temperature sensor (10) and the probed fluid having a temperature of $T_{Fluid}$ $R_2$=thermal resistivity between the first (10) and second (12) temperature sensors Combining Equation 2 into Equation 1 by substituting $$\frac{1}{R} = \frac{kA}{d}$$

results in Equation 3:

$$Q = \frac{T_1 - T_2}{R} \qquad \text{(Equation 3)}$$

FIG. 5 is a thermal model of first (10) and second (12) temperature sensors in series, as described by Equation 3. Thermal heat flux is analogous to electrical current, so just as current is equal through series resistors, heat flux is equal for both thermal resistances ($R_1$ and $R_2$) in heat transfer, as described in Equation 4.

$$Q_1 = Q_2 \qquad \text{(Equation 4)}$$

Applying Equation 4 to Equation 3 as described in FIG. 5, results in Equation 5:

$$\frac{T_{Fluid} - T_1}{R_1} = \frac{T_1 - T_2}{R_2} \qquad \text{(Equation 5)}$$

Solving for $T_{Fluid}$ results in Equation 6, which provides the basis for the calculation of water temperature in a dual temperature sensor system:

$$T_{Fluid} = \frac{R_1}{R_2} * (T_1 - T_2) + T_1 \qquad \text{(Equation 6)}$$

$T_1$ and $T_2$ are measured with the first (10) and the second (12) temperature sensors, respectively (e.g., using thermistors as sensing elements). The term $$\frac{R_1}{R_2} \equiv C$$

is a constant that may be empirically determined by testing the response of the temperature probe (2) to temperature changes with a known value of $T_{Fluid}$. If a value C is used that is too large, then the response of $T_{Fluid}$ can overshoot. If a value of C used is too small, then the response will be slower.

Fourier's law and application of Equation 6 includes a number of assumptions on an idealized system. For example, Fourier's law assumes there is no internal heat generation in the interior housing (6) of the temperature probe (2) and that the materials are homogeneous and isotropic (same thermal gradient in all directions).

The position of the placement of the second temperature sensor (12) and/or its respective sensing element (e.g., a second thermistor (50)) in the interior volume (6) of the temperature probe (2) can be adjusted to provide separation from the position of the placement of the first temperature sensor (10) and/or its respective sensing element (e.g., a first thermistor (48)) to give a faster or slower temperature response time. For example, increasing a distance of the first thermistor (10) from the probed fluid results in a slower response (e.g., increases temperature response time), while decreasing the distance of the first thermistor (10) from the probed fluid results in a faster response (e.g., decreases temperature response time). However, in practicing the disclosed devices, systems, and methods, effectively modeling the thermodynamics of temperature probe (2) relies less on the temperature response time, and more on the placement positions of of the temperature sensors (10 and/or 12) and/or their respective thermistors in or on the temperature probe (2).

Moving the second temperature sensor (12) and/or its second therrmistor (50) closer to the first temperature sensor (10) and/or its first thermistor (48) will have the effect of increasing the value of C, while moving the second temperature sensor (12) and/or its second therrmistor (50) further away from the first temperature sensor (10) and/or its first thermistor (48) will have the effect of decreasing the value of C. When the C term is larger due to placement position of the second temperature sensor (12) and/or its second therrmistor (50) the temperature measurement accuracy of the first (10) and second (12) temperature sensors and/or their respective thermistors will have a greater effect on the total accuracy of the fluid temperature measurement due to multiplying the difference in temperatures. In practicing the disclosed devices, systems, and methods, values of C may be in the range between 0.05 and 1.0, where a value of 1 means that the thermal resistances are equal between the probed fluid and first thermistor (48) (R1), and between the first (48) and second (50) thermistors, respectively.

In order to address some of the variation from the theoretical ideal assumptions, such as the internal heat generation, the disclosed temperature probe (2) is designed to dissipate a minimal amount of energy during operation to reduce any self heating effects. In order to account for the other small variations tending to deviate from the ideal Fourier model, an improvement in the form of Equations 7, 8 and 9, below, introduce terms providing for filtering of a first temperature output (38) of the first temperature sensor (10) and/or its respective thermistor (48), and providing for filtering of a second temperature output (40) of the second temperature sensor (12) and/or its respective thermistor (50). Taken together, these filtering-related terms can enable users, designers and programmers of the disclosed temperature probe (2) to optimize the temperature response time to give faster overall response with minimal overshoot error. For example, and without limitation:

$$y(n) = -\sum_{i=1}^{M} a(i) * y(n-i) + \sum_{i=1}^{N} b(i) * T_1(n-i) \qquad \text{(Equation 7)}$$

$$z(n) = -\sum_{i=1}^{M} c(i) * z(n-i) + \sum_{i=1}^{N} d(i) * T_2(n-i) \qquad \text{(Equation 8)}$$

$$T_{Fluid}(n) = T_1(n) + C * (T_1(n) - T_2(n)) + y(n) + z(n) \qquad \text{(Equation 9)}$$

Where $T_1$, $T_2$, and C are defined above with reference to Equations 1 and 6; a(i) and b(i) are filter coefficients for the first temperature output (38); c(i) and d(i) are filter coefficients for the second temperature output (40); and $\Sigma(b(i))=\Sigma(d(i))=0$.

Filters (52) on the first (38) and second (40) temperature outputs may have a high pass or band pass filter type response, with each having a gain=0 at DC. Filters (52) may include analog filtering circuitry for implemented the disclosed filtering scheme. Alternatively, the disclosed filtering scheme may be digitally implemented by processor (36). When the measured values $T_1$ and $T_2$ have a rapid rate of change in time, then the y(n) and z(n) terms will contribute to the sum in Equation 9. The sum of the coefficients b(i) and d(i) are set to zero respectively to force the y(n) and z(n) terms to zero in steady state.

Various methods using different metrics can be used for determining optimal values and/or ranges of values for filter coefficients a(i), b(i), c(i), and d(i). For example, when a(i)=c(i)=0, which defines an FIR (finite impulse response) filter, least-squares solutions can be used to determine the values and/or ranges of values for filter coefficients b(i) and d(i). Alternatively, in some embodiments, non-linear optimization methods can be used for optimizing the more general IIR (infinite impulse response) filter coefficient values. Accordingly, any of the probes or methods described herein may use one or more filters.

Any of the probes provided herein may be loaded/pressed into a sonde, including any of those described in U.S. Pat. Nos. 9,689,855, 9,835,554, 9,778,180 and D755,655, for example. The temperature sensor, optionally including the entire temperature probe, may be removably connected to the sonde, including a sonde for a multiparameter sonde. See, e.g., FIG. 6A-6B. Various different materials, including thermal barrier materials, and configurations can be utilized to thermally isolate the first temperature sensor that is used to measure liquid temperature. As described, the different configurations may be characterized in terms of the ratio $R_1/R_2$. The performance characteristics can be quantified in terms of time required to come to a certain percentage of final temperature. Table 2 below summarizes the performance characteristics in terms of time to 63% (t63), 90% (t90) and 95% (t95) for various $R_1/R_2$ with overshoot. A good metric for sensor response time is the t90 value. Equation (6) is used to generate the data, with a gain ($R_1/R_2$) of 0 corresponding to a result that is from $T_1$ only and is the slowest. For overly large $R_1/R_2$ the signal can overshoot, with attendant degradation in performance characteristics. There is an about 7.6× improvement in response speed, as shown by gain=0.25 compared to 0 (compare t90 for gain=0 of 5 minutes 4 seconds to t90 of 40 seconds for gain=0.25).

TABLE 2

Response time characteristics for various gain configurations

| Gain = R1/R2 | t63 | t90 | t95 | Overshoot (° C.) |
|---|---|---|---|---|
| 0 | 0 min 9 sec | 5 min 4 sec | 10 min 46 sec | 0 |
| 0.125 | 0 min 14 sec | 1 min 57 sec | 4 min 20 sec | 0 |
| 0.250 | 0 min 4 sec | 0 mi 40 sec | 1 min 16 sec | 0.164 |
| 0.325 | 0 min 4 sec | 0 min 13 sec | 0 min 36 sec | 0.492 |
| 0.375 | 0 min 4 sec | 0 min 9 sec | 0 min 18 sec | 0.726 |
| 0.425 | 0 min 4 sec | 0 min 9 sec | 0 min 9 sec | 0.991 |
| 0.475 | 0 min 4 sec | 0 min 9 sec | 0 min 9 sec | 1.266 |
| 0.525 | 0 min 4 sec | 0 min 9 sec | 0 min 9 sec | 1.540 |

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example, a temperature range, a ratio range, a time range, or a resistivity range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A temperature probe for measuring a fluid temperature, comprising:
    a sonde base forming an interior volume and having a distal end;
    a sonde sensor having a distal end and a proximal end, wherein said sonde sensor is connected to or passes through said sonde base distal end;
    a first temperature sensor positioned at the distal end of the sonde base to sense the temperature of the fluid;
    a second temperature sensor positioned in the interior volume of said sonde base;
    a thermal barrier thermally positioned between said first temperature sensor and said sonde base to thermally isolate the first temperature sensor from the sonde base thermal mass; and
    a processor operably connected to said first temperature sensor and to said second temperature sensor, wherein during use for the fluid that is a liquid, said processor receives a first temperature output from said first temperature sensor and a second temperature output from said second temperature sensor and determines a liquid temperature of the surrounding liquid environment;
wherein said processor determines the liquid temperature based on the formula:

$$T_{Fluid} = \frac{R_1}{R_2} * (T_1 - T_2) + T_1$$

wherein:
$T_{Fluid}$ is the liquid temperature,
$T_1$ is said first temperature output from said first temperature sensor,
$T_2$ is said second temperature output from said second temperature sensor,
$R_1$ is a thermal resistivity between said first temperature sensor and said fluid; and
$R_2$ is a thermal resistivity between said first temperature sensor and said second temperature sensor; and
wherein said first temperature sensor is separated from said sonde base by a separation distance.

2. The temperature probe of claim 1, configured to have temperature response time is characterized as coming to 90% or better of a final temperature value when submerged in a fluid for less than 2 minutes and the temperature probe has a temperature accuracy of ±0.2° C. or better.

3. The temperature probe of claim 2, further characterized in having a temperature response time of 90% or better of a final value when submerged in a fluid for less than 20 seconds and the temperature probe has a temperature accuracy of ±0.2° C. or better.

4. The temperature probe of claim 1, wherein $R_1/R_2$ is empirically determined prior to use.

5. The temperature probe of claim 1, wherein $R_1/R_2$ has a value that is greater than or equal to 0.05 and less than or equal to 0.5.

6. The temperature probe of claim 1, wherein the separation distance is greater than or equal to 1 cm and less than or equal to 50 cm.

7. The temperature probe of claim 1, wherein said first temperature sensor is separated from the instrument housing by a thermal conductor having a thickness that is greater than or equal to 0.1 mm and less than or equal to 1 cm.

8. The temperature probe of claim 7, wherein said thermal conductor comprises titanium.

9. The temperature probe of claim 1 that is part of a multiparameter sonde comprising a plurality of independent sonde sensors, each operably connected to said sonde base.

10. A method for determining the temperature of a fluid comprising the steps of:
    immersing a temperature probe of claim 1 in a fluid
    determining a ratio ($R_1/R_2$);
    measuring a first temperature with the first temperature sensor;
    measuring a probe temperature with the second temperature sensor; and
    determining the fluid temperature based on the measured first temperature, the measured probe temperature, and the ratio $R_1/R_2$.

11. The method of claim 10, further comprising the step of thermally isolating the first temperature sensor from the second temperature sensor.

12. The method of claim 10, said temperature probe characterized in having a temperature response time to 90% of final value that for an immersion time that is less than or equal to 20 seconds and a temperature accuracy of ±0.2° C. or better.

13. The method of claim 11, wherein the step of thermally isolating the first temperature sensor from the second temperature sensor is performed using a thermal barrier.

14. The method of claim 13, wherein the thermal barrier has a thermal conductivity selected from the range of 18 mW/m·K to 35 mW/m·K.

15. The method of claim 14, wherein the thermal barrier comprises an insulation layer positioned between said first temperature sensor and said second temperature sensor.

16. The method of claim 15, wherein the insulation layer comprises a rigid aerogel.

17. The method of claim 15, wherein the insulation layer comprises a material formed of one or more of a ceramic, a polymer, a carbon-containing material, a metal, a carbide or any combination thereof.

* * * * *